United States Patent
Smith et al.

(10) Patent No.: US 11,889,441 B2
(45) Date of Patent: Jan. 30, 2024

(54) EFFICIENT VALIDATION OF TIME-SYNCHRONIZATION ACCURACY IN A SCHEDULED TIME SENSITIVE NETWORK (TSN)

(71) Applicant: Cisco Technology, Inc., San Jose, CA (US)

(72) Inventors: Malcolm Muir Smith, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 17/533,987

(22) Filed: Nov. 23, 2021

(65) Prior Publication Data
US 2023/0164710 A1    May 25, 2023

(51) Int. Cl.
*H04W 56/00* (2009.01)
(52) U.S. Cl.
CPC ..... *H04W 56/001* (2013.01); *H04W 56/0035* (2013.01)
(58) Field of Classification Search
None
See application file for complete search history.

(56) References Cited

U.S. PATENT DOCUMENTS

| | | | |
|---|---|---|---|
| 5,663,958 A | 9/1997 | Ward | |
| 2017/0303223 A1* | 10/2017 | Thompson | H04W 56/004 |
| 2019/0123843 A1* | 4/2019 | Bush | H04L 63/061 |
| 2019/0132762 A1 | 5/2019 | Zhu et al. | |
| 2020/0092807 A1* | 3/2020 | Li | H04W 52/02 |

FOREIGN PATENT DOCUMENTS

| | | |
|---|---|---|
| CN | 111436113 A | 7/2020 |
| WO | 2020009622 A1 | 1/2020 |
| WO | 2020167013 A1 | 8/2020 |
| WO | 2021118467 A1 | 6/2021 |
| WO | 2021204342 A1 | 10/2021 |

OTHER PUBLICATIONS

Notification and Transmittal of the International Search Report and the Written Opinion issued in corresponding International Application No. PCT/US2022/050621 dated Mar. 13, 2023 (16 pages).
Lee, Yung-Ting et al. "Time Synchronization Methods for Femtocell" IEEE C802.16m-08/1323r1 (Nov. 5, 2008) (10 pages).

* cited by examiner

*Primary Examiner* — Saad Khawar
(74) *Attorney, Agent, or Firm* — Merchant & Gould P.C.

(57) ABSTRACT

A reverse time synchronization may be performed between a sending device and a receiving device. Then a Time Error (TE) between the sending device and the receiving device may be determined based on the reverse time synchronization. A gate time on the receiving device may be scheduled based on the determined TE.

14 Claims, 4 Drawing Sheets

EFFICIENT VALIDATION OF TIME-SYNCHRONIZATION ACCURACY IN A SCHEDULED TIME SENSITIVE NETWORK (TSN)

TECHNICAL FIELD

The present disclosure relates generally to time-synchronization accuracy.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
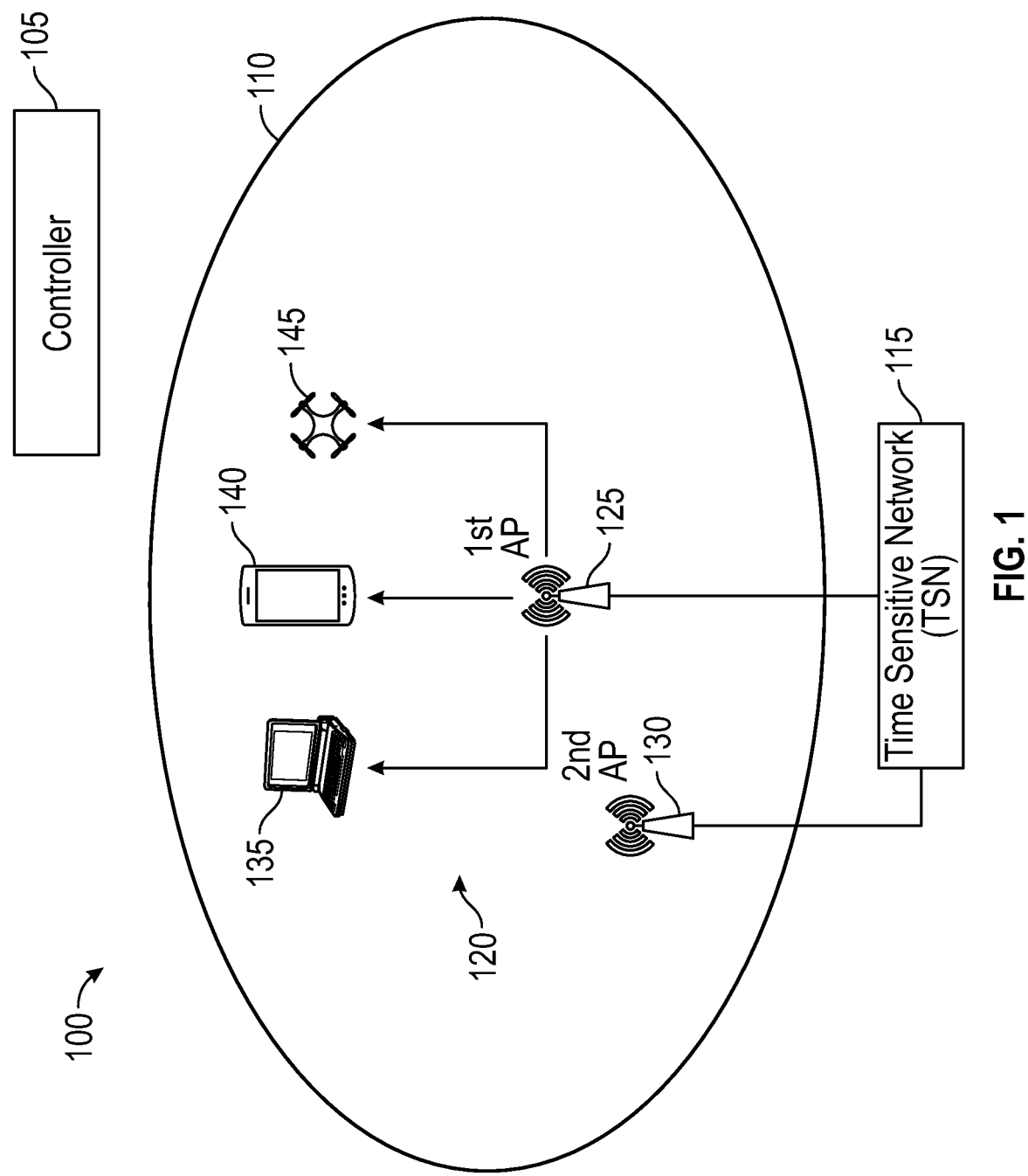
FIG. 1 is a block diagram of an operating environment for providing time-synchronization accuracy.

Time-synchronization accuracy may be provided. A reverse time synchronization may be performed between a sending device and a receiving device. Then a Time Error (TE) between the sending device and the receiving device may be determined based on the reverse time synchronization. A gate time on the receiving device may be scheduled based on the determined TE.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Time Sensitive Networking (TSN) is a set of Institute of Electrical and Electronic Engineers (IEEE) 802 Ethernet sub-standards that are defined by the IEEE TSN task group. These standards enable deterministic real-time communication over Ethernet. TSN achieves determinism over Ethernet by using time synchronization and a schedule which is shared between network components. By defining queues based on time, Time-Sensitive Networking ensures a bounded maximum latency for scheduled traffic through switched networks. This means that in a TSN network, latency of critical scheduled communication may be guaranteed. The IEEE 802.1AS standard defines a mechanism to support Generic Precision Time Protocol (gPTP) (e.g., Time-Sensitive Networking (TSN) based time synchronization) over Wi-Fi via the Timing Measurement (TM) or Fine Timing Measurement (FTM) protocol.

In control applications with strict deterministic requirements, such as those found in automotive and industrial domains, TSN may offer a way to send time-critical traffic over a standard Ethernet infrastructure. This may enable the convergence of all traffic classes and multiple applications in one network. In practice this may mean that the functionality of standard Ethernet may be extended so that message latency may be guaranteed through switched networks, critical and non-critical traffic may be converged in one network, and higher layer protocols can share the network infrastructure.

Establishing TSN in wireless (e.g., Wi-Fi) environments may be complex, in part because the synchronization mechanism described in IEEE 802.1AS was designed for Ethernet networks, and extended to Wi-Fi by directly borrowing timestamps and clock exchange vehicles through TM and FTM. However, the IEEE 802.11 medium is quite different from Ethernet. For example, in IEEE 802.11, channel variance and chipset processing tolerances may cause time synchronization to not be accurate. Strict and direct use of IEEE 802.1AS one way scheduling may cause clock alignment swings and could be harmful in some application scenarios (e.g., a mobile robot may shut down because a control packet was not received at an expected time).

Thus, when gPTP is applied to IEEE 802.11, there may be a need to evaluate the clock synchronization accuracy between a leader and a station, and account for the accuracy tolerance window for Wi-Fi scheduling. Such adjustment may be important to the success of wireless TSN. Embodiments of the disclosure may evaluate the inaccuracy of the clock synchronization between a clock leader (e.g., an AP) and a station (e.g., a client device). This inaccuracy may then be taken into account to adjust the time-sensitive packet transmission window and the delay tolerance.

FIG. 1 shows an operating environment 100 for providing time-synchronization accuracy. As shown in FIG. 1, operating environment 100 may comprise a controller 105, a coverage environment 110, and a Time Sensitive Network (TSN) 115. Coverage environment 110 may comprise, but is not limited to, a Wireless Local Area Network (WLAN) comprising a plurality of stations 120. The plurality of stations 120 may comprise a plurality of Access Points (APs) and a plurality of client devices. At any given time, any one of the plurality of stations 120 may comprise an Initiating Station (ISTA) or a Responding Station (RSTA). The plurality of APs may provide wireless network access (e.g., access to the WLAN) for the plurality of client devices. The plurality of APs may comprise a first AP 125 and a second AP 130. Each of the plurality of APs may be compatible with specification standards such as, but not limited to, the Institute of Electrical and Electronics Engineers (IEEE) 802.11 specification standard for example. Coverage environment 110 may comprise, but is not limited to, an outdoor wireless environment, such as a mesh (e.g., a Wi-Fi mesh). Embodiments of the disclosure may also apply to indoor wireless environments and non-mesh environments.

Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may comprise a first client device 135 (e.g., a laptop computer), a second client device 140 (e.g., a smart phone), and a third client device 145 (e.g., a drone).

Controller 105 may comprise a Wireless Local Area Network controller (WLC) and may provision and control operating environment 100 (e.g., the WLAN). Controller 105 may allow the plurality of client devices to join operating environment 100. In some embodiments of the disclosure, controller 105 may be implemented by a Digital Network Architecture Center (DNAC) controller (i.e., a Software-Defined Network (SDN) controller) that may configure information for operating environment 100 in order to provide time-synchronization accuracy consistent with embodiments of the disclosure.

The elements described above of operating environment 100 (e.g., controller 105, first AP 125, second AP 130, first client device 135, second client device 140, and third client device 145) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
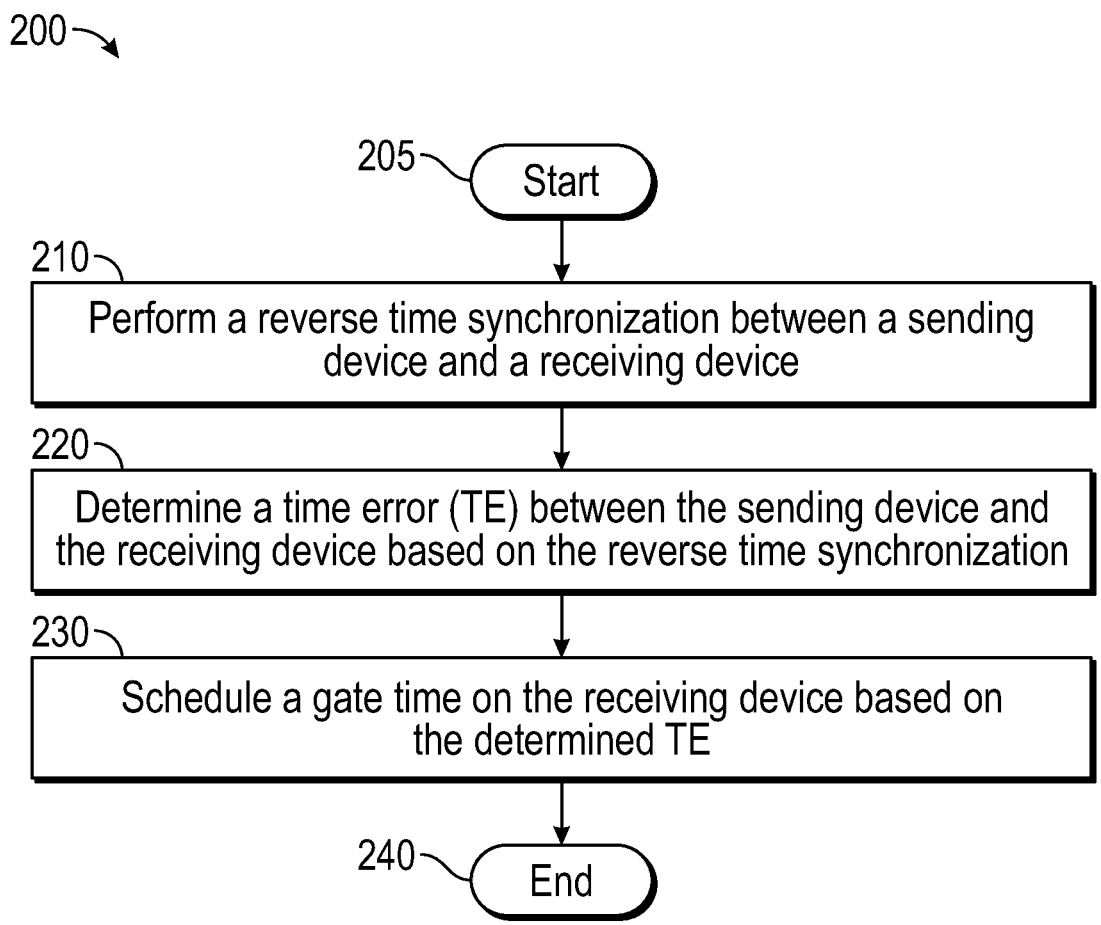
FIG. 2 is a flow chart of a method for providing time-synchronization accuracy.

FIG. 2 is a flow chart setting forth the general stages involved in a method 200 consistent with an embodiment of the disclosure for providing time-synchronization accuracy. Method 200 may be implemented using first AP 125 as described in more detail above with respect to FIG. 1. Ways to implement the stages of method 200 will be described in greater detail below.

Figure 3:
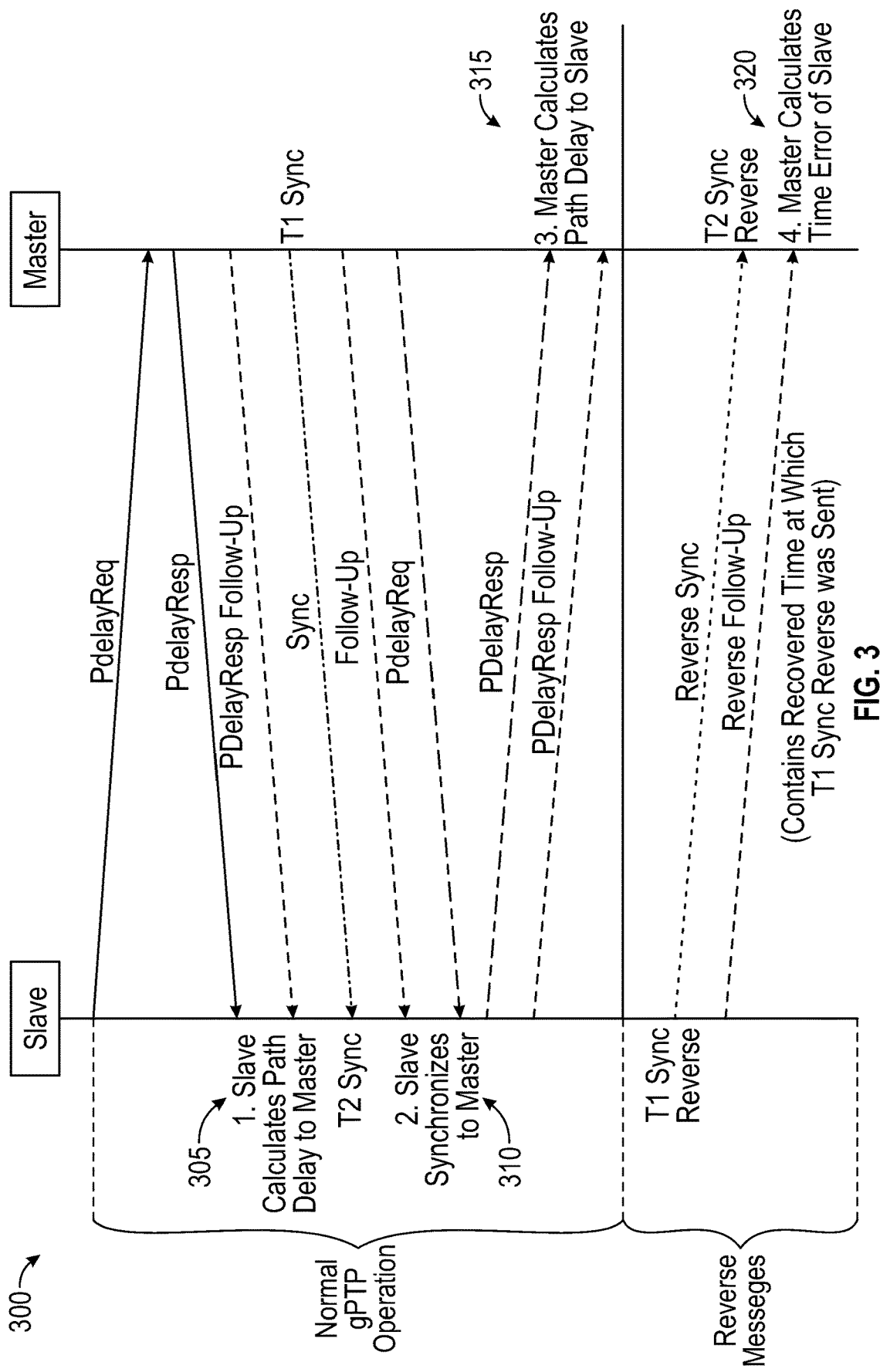
FIG. 3 is a flow diagram of a method for performing a reverse time synchronization between a sending device and a receiving device.

Method 200 may begin at starting block 205 and proceed to stage 210 where first AP 125 may perform a reverse time synchronization (e.g., a reverse time synchronization process or procedure) between a sending device (e.g., first AP 125) and a receiving device (e.g., a target receiving device, for example, first client device 135). For example, FIG. 3 is a flow diagram of a method 300 for performing a reverse time synchronization between the sending device and the receiving device. In some embodiments, the sending device may comprise an AP (e.g., first AP 125) and the receiving device may comprise a client device (e.g., first client device 135). In other embodiments, the sending device may comprise a client device (e.g., first client device 135) and the receiving device may comprise an AP (e.g., first AP 125).

As shown in FIG. 3, a slave device (i.e., the receiving device) may calculate a path delay to a master device (i.e., the sending device). (Stage 305). Then, the slave device may synchronize to the master device. (Stage 310). Next, the master device may calculate a path delay to the salve device. (Stage 315). The master device may then calculate the Time Error (TE) of the slave device. (Stage 320).

From stage 210, where first AP 125 performs the reverse time synchronization between the sending device and the receiving device, method 200 may advance to stage 220 where first AP 125 may determine a TE between the sending device (e.g., first AP 125) and the receiving device (e.g., first client device 135) based on the reverse time synchronization. In the following example, the first AP 125 may comprise the master and the first client device 135 may comprise the slave. As discussed above with respect to FIG. 3, the slave may receive the time from the master and then may send its time back to the master. The master may then evaluate the difference between its local time and the time returned by the slave. That is, the master and slave may switch roles using a different PTP domain and then the gPTP master computes the TE, for example, as <offsetFromSlave>=<Time on the master clock>−<Time on the slave clock>=<master time>−<origin timestamp>−<correction fields>−<path delay to slave>. At stage 320 of method 200, the master may have an estimate of the TE (its clock against the slave).

Once first AP 125 determines the TE between the sending device (e.g., first AP 125) and the receiving device (e.g., first client device 135) based on the reverse time synchronization in stage 220, method 200 may continue to stage 230 where first AP 125 may schedule a gate time on the receiving device (e.g., first client device 135) based on the determined TE. For example, an application source (e.g., in TSN 115) may send a packet at an expected time ($t_0$), expecting the packet, after a known transit time, to arrive at a client sink (e.g., first client device 135) at that time ($t_{0+}$). Because this transit time over one hop may be insignificant (i.e., 1 ns) compared to the applications requirements, conventional systems may employ Time-Aware-Shaper (TAS) as per IEEE 802.1Qbv to reserve the medium at the gate time ($t_{0+}$). This reservation may be timed to coincide with the expected packet arrival, or possibly its send time ($t_0$), if it is known that the gate open duration ($t_d$) accounts for the packet transmission (e.g., at the lowest possible data-rate). That is, the gate may be open from $t_{0+}$ to $t_{0+}+t_d$. The client (e.g., first client device 135), presuming time-synchronization, wakes up (or otherwise activates) at that time to receive the packet and then may return to an idle or sleep mode. A similar model may be used for the reverse process (i.e., first client device 135 to first AP 125) where first client device 135 wakes up at the expected time and attempts to transmits to first AP 125 who holds the gate open for it. This may be important because in Wi-Fi, the client devices would like to sleep as often as possible to save battery life, but still receive their packets at the correct time for their application process (e.g., mobile robot).

However, if the packet from the source (e.g., first AP 125) arrives at the expected time, but the expected scheduled time ($t_{0+}-E$) is behind (e.g., by error time E) due to a time synchronization error between first client device 135 and first AP 125, first AP 125 may not have a packet to deliver to first client device 135. Likewise, if the expected scheduled ($t_{0+}+E$) is ahead (e.g., by error time E) first AP 125 may either deliver the packet late (if the application supports queuing) or may not deliver a packet to first client device 135 (i.e., late packet is dropped).

To prevent such critical lost or delayed packet conditions, embodiments of the disclosure may leverage the TE estimated from the reverse time synchronization process as an estimate of the scheduling error (E). That is, when the sink STA (e.g., first client device 135) is to be scheduled, embodiments of the disclosure may adjust the IEEE 802.1Qbv gate time for the sink STA (based on the gPTP leader clock) which was previously $t_{0+}$ to $t_{0+}-TE$ and the end of the scheduled gate time to $t_{0+}-TE+t_d$. Once first AP 125 schedules the gate time on the receiving device (e.g., first client device 135) based on the determined TE in stage 230, method 200 may then end at stage 240.

In some embodiments of the disclosure, in an initial phase, the AP and the client device may perform clock time and reverse clock time exchange. Both sides may record the exchange duration. Taking the example of an FTM process, the iFTMR+2 frame FTM burst exchange may last between 1 and 2 ms (depending on congestion conditions). This time may be short at the scale of the channel stability. The time at which time-sensitive packets are sent (and thus expected to be received at the AP and client device level) is known (minus the clock accuracy issue discussed above). Thus, prior to that time, the AP and the client may operate a time+reverse time synchronization exchange, and record the momentary fluctuations in TE (e.g., due to underlying FTM/TM errors caused by the channel). The gate times may then be adjusted for the next packet instance based on this temporal TE measurement.

In other embodiments, the AP may measure the channel utilization, and also use Neighbor Discovery Protocol (NDP) messages to evaluate the channel. The AP and the client device may perform repeated reverse synchronization processes to form statistical moments of TE. The mean TE may then be evaluated over an interval. The interval may be a fixed sliding temporal value (e.g., last 5 seconds), or may be reset based on threshold-based significant change to the Channel Utilization (CU) or the channel state. Within each temporal value, the AP and the client device may use the 1st+N*2nd moment to adjust the TE.

In yet other embodiments, although the channel is likely different for different client devices, it is expected that multiple client devices in the same cell may be affected by common events. The AP may perform clock direct and reverse synchronization to multiple client devices (e.g., target receiving devices and non-target receiving devices) in the cell. The AP may then use the TE statistics from these multiple client devices to distinguish statistical components of delay related to the AP and that of the individual client device. Thus for example, observing that the mean TE for all client devices is forward, the AP may then evaluate the variance drift of measured client device TE (e.g., using Tukey test), then conclude on one hand of its own likely error (e.g., backward), and on the other hand on individual client devices (e.g., within 3 individual sigmas). The client devices that were identified (e.g., through Tukey) as not displaying Gaussian variance may be treated independently (tested continuously). For other client devices, the AP gPTP leader clock may be adjusted by the former component ($TE_0$), allowing a smaller individual client device $TE_i$.

Figure 4:
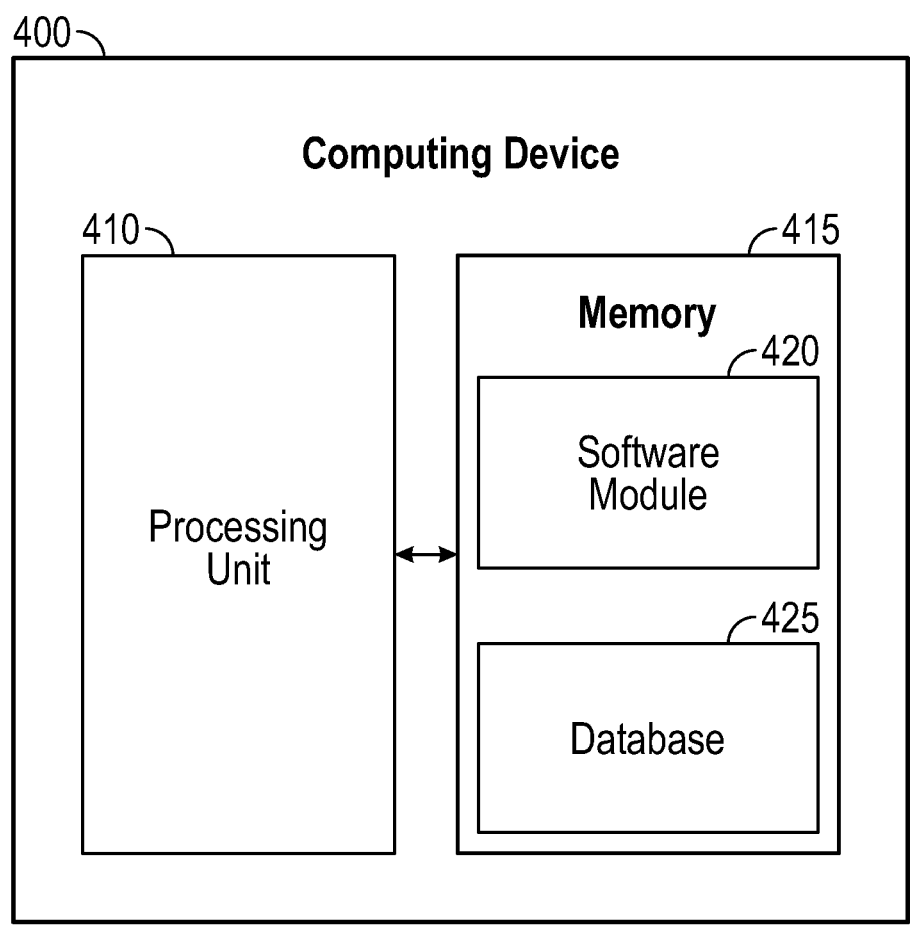
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing time-synchronization accuracy as described above with respect to FIG. 2. Computing device 400, for example, may provide an operating environment for controller 105, first AP 125, second AP 130, first client device 135, second client device 140, or third client device 145. Controller 105, first AP 125, second AP 130, first client device 135, second client device 140, and third client device 145 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   performing a reverse time synchronization procedure between a sending device and a target receiving device;
   determining a Time Error (TE) between the sending device and the target receiving device based on the reverse time synchronization procedure wherein determining the TE based on the reverse time synchronization procedure comprises performing other reverse time synchronizations procedures between the sending device and the target receiving device in addition to the reverse time synchronization procedure and determining the TE based on a statistical moment of the other reverse time synchronization procedures and the reverse time synchronization procedure; and
   scheduling a gate time on the target receiving device based on the determined TE.

2. The method of claim 1, wherein the gate time comprises a beginning gate time of an expected time ($t_0$) a packet is sent from a source plus a known transit time minus the TE.

3. The method of claim 1, wherein the gate time comprises an ending gate time of an expected time ($t_0$) a packet is sent from a source plus a known transit time minus the TE plus an gate open duration ($t_d$).

4. The method of claim 1, wherein the sending device comprises an Access Point (AP) and the target receiving device comprises a client device.

5. The method of claim 1, wherein the target receiving device comprises an Access Point (AP) and the sending device comprises a client device.

6. A system comprising:
   a memory storage; and
   a processing unit coupled to the memory storage, wherein the processing unit is operative to:
   perform a reverse time synchronization procedure between a sending device and a target receiving device;
   determine a Time Error (TE) between the sending device and the target receiving device based on the reverse time synchronization procedure wherein the processing unit being operative to determine the TE based on the reverse time synchronization comprises the processing unit being operative to perform other reverse time synchronizations between the sending device and other non-target receiving devices in addition to the reverse time synchronization and determine the TE based on the other reverse time synchronizations and the reverse time synchronization; and
   schedule a gate time on the target receiving device based on the determined TE.

7. The system of claim 6, wherein the gate time comprises a beginning gate time of an expected time ($t_0$) a packet is sent from a source plus a known transit time minus the TE.

8. The system of claim 6, wherein the gate time comprises an ending gate time of an expected time ($t_0$) a packet is sent from a source plus a known transit time minus the TE plus an gate open duration ($t_d$).

9. The system of claim 6, wherein the sending device comprises an Access Point (AP) and the target receiving device comprises a client device.

10. A non-transitory computer-readable medium that stores a set of instructions which when executed perform a method executed by the set of instructions comprising:
    performing a reverse time synchronization procedure between a sending device and a target receiving device;

determining a Time Error (TE) between the sending device and the target receiving device based on the reverse time synchronization procedure wherein determining the TE based on the reverse time synchronization procedure comprises performing other reverse time synchronizations between the sending device and the target receiving device in addition to the reverse time synchronization and determining the TE based on a statistical moment of the other reverse time synchronizations and the reverse time synchronization; and scheduling a gate time on the target receiving device based on the determined TE.

11. The non-transitory computer-readable medium of claim 10, wherein the gate time comprises a beginning gate time of an expected time ($t_o$) a packet is sent from a source plus a known transit time minus the TE.

12. The non-transitory computer-readable medium of claim 10, wherein the gate time comprises an ending gate time of an expected time ($t_o$) a packet is sent from a source plus a known transit time minus the TE plus an gate open duration ($t_d$).

13. The non-transitory computer-readable medium of claim 10, wherein the sending device comprises an Access Point (AP) and the target receiving device comprises a client device.

14. The non-transitory computer-readable medium of claim 10, wherein the target receiving device comprises an Access Point (AP) and the sending device comprises a client device.

* * * * *